C. F. PIKE.
TRAP FOR CATCHING PORPOISES.
APPLICATION FILED SEPT. 11, 1909.
972,228.
Patented Oct. 11, 1910.
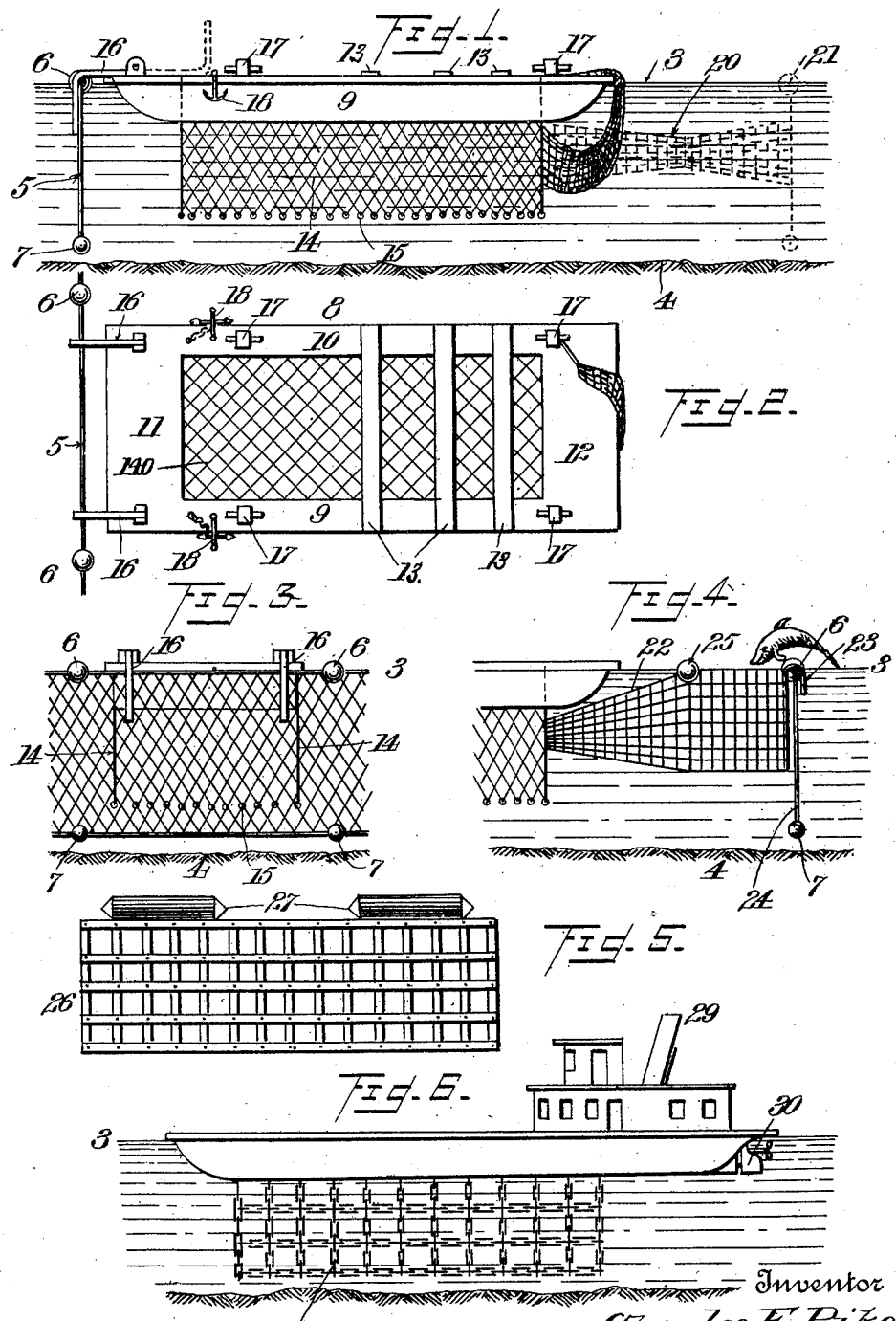

UNITED STATES PATENT OFFICE.

CHARLES F. PIKE, OF PHILADELPHIA, PENNSYLVANIA.

TRAP FOR CATCHING PORPOISES.

972,228. Specification of Letters Patent. Patented Oct. 11, 1910.

Application filed September 11, 1909. Serial No. 517,248.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, (Case E,) of which the following is a specification.

My invention relates to devices for catching fish and especially for catching the porpoise.

In this art as heretofore developed means have been provided for this purpose which comprises in general terms obstructions, such as nets or seines, placed in the path traveled by the fish, and in the rear thereof receptacles with forward openings coinciding with openings in the obstructions, whereby the fish upon encountering the obstruction will pass through the opening therein into the receptacle in the rear thereof. The porpoise generally swim near the surface of the water and while they will to some extent pass through the opening in the obstruction placed in their path, they will be very liable, when they meet an obstruction, to jump over it and thus be lost to the fisher.

The general object of my invention is to provide means whereby the fish will be caught after jumping over the obstruction and thus avoid the loss of such a large number as would occur in the use of the means now provided.

The special object of the present invention is to provide an improved construction of trap which will be simple in construction, seaworthy, will admit of a free circulation of water, present the least resistance to its passage through the water or to the tides or currents thereof, and to allow the surface of the water within the trap to be freely exposed to the air With this object in view, the invention consists in the improved construction, arrangement and combination of parts which will be hereinafter fully described and afterward specifically claimed.

I have illustrated an embodiment of my invention in the accompanying drawing, in which—

Figure 1 is a view, in side elevation, of an apparatus constructed in accordance with my invention. Fig. 2 is a top plan view with parts in different positions. Fig. 3 is a front end elevation. Figs. 4, 5 and 6 are views of modified forms and arrangements.

Referring specifically to the drawing 3 indicates the surface and 4 the bottom of a body of water in which the apparatus is to be operated.

An obstruction, in this instance, an ordinary seine, is shown at 5 supported by floats 6 of any ordinary kind at the surface of the water and held down by any ordinary weights or sinkers 7 at the bottom.

At 8 is shown a trap in the form of a floating box or live box which is composed of sides 9, 10, ends 11, 12, and top slats 13 so placed as to leave the forward portion of the top of the trap open to receive fish jumping over the obstruction. This live trap is shown as of rectangular form but such form may be varied so long as the construction is such as to permit of its being placed with the upper edge of its front end 11 near the obstruction 5. The bottom of the trap is omitted and a net 14 having sides, ends and bottom is suspended from the sides and ends, such net being shown in Fig. 1 as made of ordinary netted fabric such as is used in nets or seines but other materials may be used, some of which will be hereinafter described. The net 14 is shown as provided with ordinary weights or sinkers 15 to hold it in proper shape, and is closed at the bottom as shown at 140 in Fig. 2. The sides and ends of the trap may be made of buoyant materials, such as timbers, or of hollow metal, so that it will always float, its construction being sufficiently strong to resist the action of waves in the open sea and to permit of its being towed from place, or propelled by a motor or engine. The trap may be provided with hooks 16 to removably secure it to the obstruction 5, cleats 17, 17 upon which to secure ropes for towing or tying up to a wharf, and anchors 18. The net 14 may be provided also with a conical extension 20 for the purpose of receiving or discharging fish. When desired to catch fish, the extension may be attached to an obstructing seine 21, as shown in dotted lines in Fig. 1, opposite to an opening in the obstruction, in which instance the trap will form the main body of the fish net and suitable means may be provided to prevent the escape of fish by the way they enter. When not in use the extension may be pulled up upon the body of the trap as shown in full lines in Fig. 1. The extension may be used also as part of a porpoise trap, as shown at 22, in Fig. 4, and in such case it will be provided with hooks 23 to engage an obstruction 24, an opening in its top adjacent to the obstruction to admit the porpoise jumping over the obstruction into the trap, and suitable floats 25.

The net forming the bottom part of the trap may be constructed of metal or wood strips as shown at 26 in Fig. 5, in which case floats 27 may be used to support it, if desired, or it may be attached to a floating body, such as is shown in Figs. 1 and 2. The net may also be made of chains, as at 28 in Fig. 6, and the floating body of the trap may also be provided with suitable means of self propulsion, such as a motor or engine, with smoke-stack 29, rudder 30, etc., as indicated in Fig. 5.

When the trap is used for porpoise, as in Fig. 4, the hooks 16 may be folded back as shown in dotted lines in Fig. 1.

Having fully described my invention, what I claim as new and desire to secure by Letters Patent is—

1. A porpoise trap comprising an obstruction in the path of the fish, an open floating body at the rear of and substantially at a right angle to the obstruction, said floating body being composed of buoyant sides and ends surrounding a central opening in position to receive fish jumping over the obstruction, a net suspended from the bottom of the side and end walls of, and below said opening, means for keeping the net suspended in proper form, and means for securing the forward end of the floating body directly to the obstruction.

2. A porpoise trap comprising an obstruction in the path of the fish, an open floating body at the rear of and substantially at a right angle to the obstruction, said floating body being composed of buoyant sides and ends surrounding a central opening in position to receive fish jumping over the obstruction, means for partially closing the rear portion of said opening leaving the forward portion open to receive the fish jumping over the obstruction, a net suspended from the bottom of the side and end walls of, and below said opening, means for keeping the net suspended in proper form, and means for removably securing the trap directly to the rear side of the obstruction at substantially a right angle thereto.

3. A porpoise trap comprising an open floating body, composed of buoyant side and end walls completely surrounding a central opening, a net suspended from the bottom of the side and end walls of, and below said opening, means for keeping the net suspended in proper form, means for securing the trap directly to an obstruction in position to receive into the net fish jumping over the obstruction, and means for preventing the fish jumping out of the net.

4. A porpoise trap comprising an open floating body, composed of buoyant sides and ends surrounding a central opening, a net suspended from the sides and ends below said opening, means for keeping the net suspended in proper form, means for securing the trap to an obstruction, means for preventing the jumping out of the fish, means below the floating body for discharging the fish, and means for self propulsion of the floating body.

5. A porpoise trap comprising an open floating body composed of buoyant sides and ends surrounding a central opening, a flexible net suspended from the sides and ends below said opening, weights arranged around the bottom edges of the net to keep it suspended in proper form, an opening in the body of the net, and a flexible tubular extension from said opening for discharging the contents of the net.

In testimony whereof I affix my signature in presence of two witnesses.

CHARLES F. PIKE.

Witnesses:
Wm. A. Pike,
John Devlin.